Feb. 14, 1961 N. B. MICHIE 2,971,261
MAGNETIC CYLINDER SQUARE
Filed Aug. 27, 1956
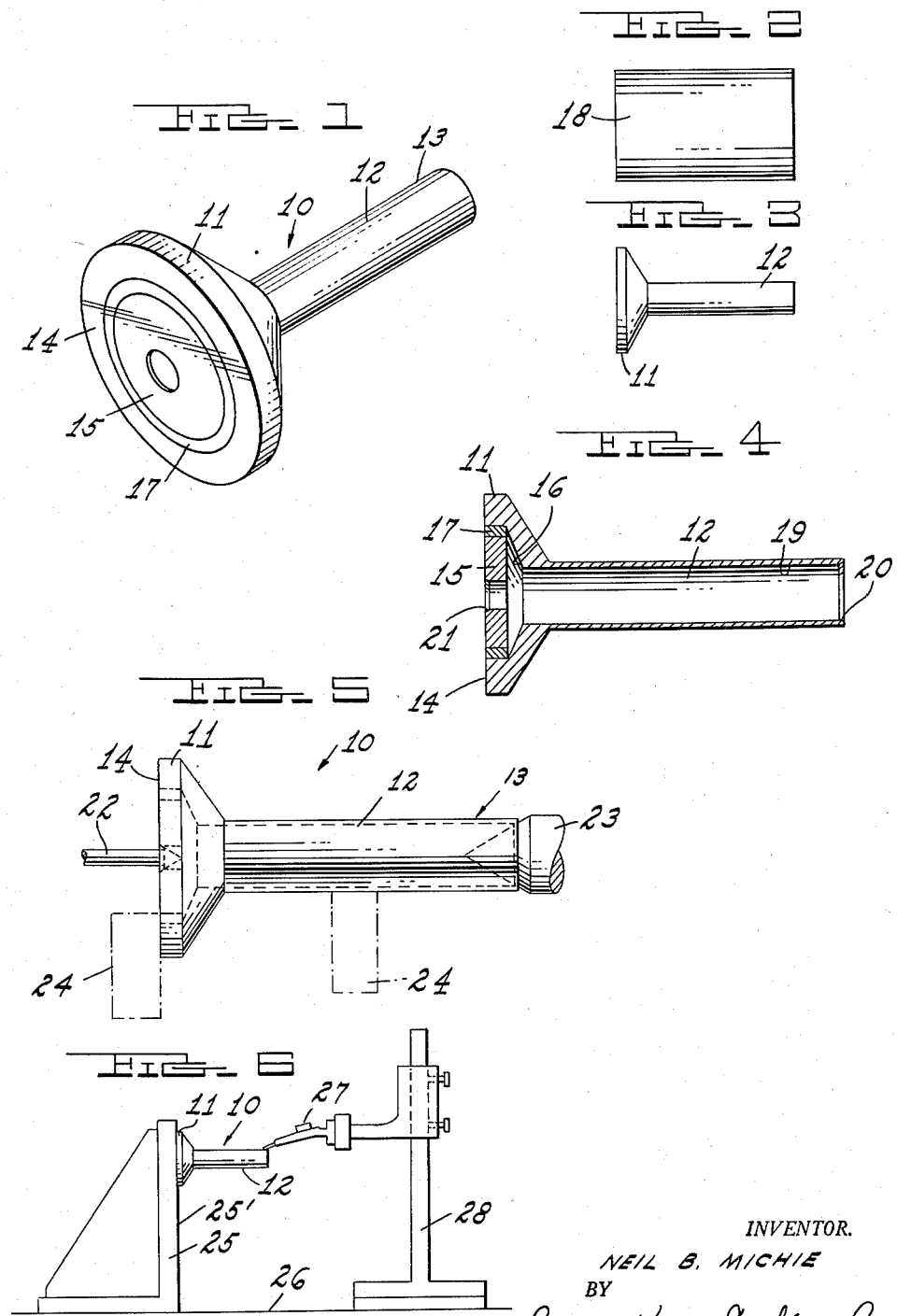
INVENTOR.
NEIL B. MICHIE
BY
Barnes, Kisselle, Laughlin & Raisch
ATTORNEYS United States Patent Office 2,971,261
Patented Feb. 14, 1961

2,971,261
MAGNETIC CYLINDER SQUARE

Neil Buchanan Michie, Hazel Park, Mich., assignor to A. A. Gage Company, Ferndale, Mich., a corporation of Michigan Filed Aug. 27, 1956, Ser. No. 606,280

2 Claims. (Cl. 33—112)

This invention relates to gaging devices and particularly to a device for checking squareness.

In the making of acurate parts, for example, by machining, it is often necessary to check the squareness of a part. In one method of checking squareness, a square block is clamped to a surface which is at right angles to a base plate and the square block is then used as a reference. Such blocks are made by machining or otherwise finishing each surface. Since each of the surfaces is machined in succession with one surface being used as a reference for another, it is not always possible to obtain absolute accuracy or squareness between the surfaces. In addition, if such a block is dropped or otherwise marred, the value of the block for checking squareness is completely destroyed.

It is an object of this invention to provide a novel square which may be readily applied to a surface for use as a reference in gaging squareness.

It is a further object of this invention to provide such a square which may be readily manufactured with great accuracy.

It is a further object of this invention to provide such a square which may be readily repaired in the event that it is dropped or otherwise marred.

It is a further object of this invention to provide such a square which is firmly held in required position without clamping.

In the drawings:

Fig. 1 is a perspective view of the square.

Fig. 2 is a side elevational view of a block of material from which the square may be manufactured.

Fig. 3 is a side elevational view of the workpiece during one stage of manufacture of the square.

Fig. 4 is a longitudinal sectional view of the square.

Fig. 5 is a diagrammatic view of another step in the manufacture of the square.

Fig. 6 is a diagrammatic view showing the use of the square.

As shown in Fig. 1, the cylindrical square 10 comprises a head 11 and a cylindrical portion 12 extending from one side of head 11. The outer surface 13 of cylindrical portion 12 is accurately made to be circular throughout and the face or surface 14 of head 11 is accurately made to be at right angles to surface 13 as presently described. An annular magnet 15 is set into an opening 16 in the head 11 and is held in spaced relationship thereto by a non-magnetic material 17 such as thermosetting resin or copper. The outer face of magnet 15 lies in the same plane as surface 14 of head 11. The head 11 and cylindrical portion 12 are thus spaced and isolated from the magnet 15 so that magnet 15 has substantially no effect on the head 11 and cylindrical portion 12.

The square gaging device 10 is preferably made from a block of metal 18, as shown in Fig. 2. The block is made of a hard metal such as machine steel, and preferably of a cold rolled steel which is carburized and hardened. This block is placed in a lathe and turned to give the general shape to the fixture as shown in Fig. 3. The cylindrical portion 12 and head 11 are then drilled longitudinally to provide a cavity 19 and lessen the weight of the gaging device. In addition, cavity 16 is formed in head 11. Magnet 15 is then inserted in cavity 16. Where thermosetting resin is used to hold the magnet, the resin is cured by placing the device in an oven or is permitted to cure in the open air if it is of the room-temperature setting type. A bevel or center 20 is provided in the end of cylindrical portion 12 and a bevel or center 21 is provided in magnet 15. The workpiece is then placed between lathe centers 22, 23, as shown in Fig. 5 and a rotating grinding wheel 24 is brought into contact with the outer surface 13 of cylindrical portion 12 and moved longitudinally thereof to grind a smooth and accurate surface. The grinding wheel is then brought into contact with surface 14 of head 11 to grind a smooth and accurate surface thereon, without removing the workpiece from the centers. In this manner, the surface 14 of head 11 and the outer surface of magnet 15 are ground so that they are in a plane which forms an accurate right angle with outer surface 13 of cylindrical portion 12.

The gaging device 10 may be used in the manner shown in Fig. 6. A plate 25 is provided with its surface at right angles to base plate 26. Square gaging device 10 is placed with surface 14 of head 11 against the surface of plate 25 and is held thereagainst by magnet 15. In this position, every portion of the outer surface 13 of cylindrical portion 12 is at right angles to the face 25' of plate 25 and is parallel to base plate 26. This can be readily checked by a micrometer gage 27 mounted on the standard 28. The relationship of outer surface 13 to the surfaces of plates 25, 26 is the same regardless of the relative rotation of the gaging device 10 so that no gage is required to establish the relationship. The gaging device 10 may merely be placed with surface 14 against a flat surface and then outer surface 13 is ipso facto at right angles to the surface against which head 11 has been placed. The gage 10 may then be used as a reference surface.

In the event that the gaging device 10 is dropped or otherwise marred, it may be readily repaired by placing it within centers 22, 23, bevelled surfaces 21, 20 permitting the device to be readily placed on the lathe centers. The grinding wheel may then again be brought into contact with the surfaces of the cylindrical portion 12 and head 11 to reestablish the right-angle relationship between surfaces 13 and 14.

It can thus be seen that I have provided a square gaging device which may be readily manufactured with the surfaces thereof at right angles to each other to a degree which is not possible when the surfaces are separately formed with one surface being used as a reference for the other. In addition, I have provided a square gaging device which may be readily used to establish a reference line for checking squareness. The gaging device may be repaired without any material effect on its accuracy.

I claim:

1. A square gaging fixture comprising a circular head of magnetic material and a cylindrical portion of magnetic material rigidly fixed on one face of said head and extending axially of said circular head, the diameter of said cylindrical portion being substantially less than the diameter of said head, the axial extent of said cylindrical portion being substantially greater than the axial extent of said head, the opposite face of said head being formed with an axial opening defined by an annular portion of said face, an annular magnet, non-magnetic material completely surrounding the magnet and positioning the magnet centrally in said opening in spaced relation to said head and said cylindrical portion, all portions of said head and said cylindrical portion being magnetically spaced and isolated from said magnet, such that said magnet has minimum effect on said head and said cylindrical portion, said annular portion of said opposite face of said head surrounding said magnet presenting an accurately ground surface for engaging a workpiece, the surface of said cylindrical portion presenting an accurately ground gauging surface which forms an accurate right angle with said annular portion of said opposite face of said head, said magnet having an outer exposed surface which is accurately ground and substantially coplanar with the accurately ground annular portion of the opposite face of said head, means on said opposite face of said head defining a surface for engaging one center of a grinding machine in coaxial relationship with the cylindrical portion, and means on the free end of the cylindrical portion which is remote from the head defining a surface for engaging the opposed center of said grinding machine so that said fixture may be mounted on said grinding machine for regrinding the annular portion of the opposite face and the cylindrical surface of the cylindrical portion in accurate right angle relation.

2. The combination set forth in claim 1 wherein said cylindrical portion is hollow throughout its axial extent, said axial opening in said head communicating with the interior of said cylindrical portion.

References Cited in the file of this patent

UNITED STATES PATENTS

| | | |
|---|---|---|
| 1,537,622 | Sears | May 12, 1925 |
| 1,713,743 | Challet | May 21, 1929 |
| 1,719,812 | Shaw | July 2, 1929 |
| 1,778,481 | Boucher | Oct. 14, 1930 |
| 2,326,562 | Rensen | Aug. 10, 1943 |
| 2,337,248 | Koller | Dec. 21, 1943 |
| 2,379,048 | Thomas | June 26, 1945 |
| 2,398,121 | Silvermaster | Apr. 9, 1946 |
| 2,462,003 | Rose | Feb. 15, 1949 |
| 2,686,371 | Flis | Aug. 17, 1954 |

FOREIGN PATENTS

| | | |
|---|---|---|
| 111,601 | Great Britain | Dec. 6, 1917 |
| 1,072,087 | France | Sept. 8, 1954 |